US012103819B2

(12) United States Patent
Haapaniemi et al.

(10) Patent No.: US 12,103,819 B2
(45) Date of Patent: Oct. 1, 2024

(54) CONSTRUCTION ARRANGEMENT OF AN ELEVATOR AND METHOD

(71) Applicant: Kone Corporation, Helsinki (FI)

(72) Inventors: Markku Haapaniemi, Helsinki (FI); Matti Rasanen, Helsinki (FI); Jari Ryhanen, Helsinki (FI); Jaakko Kahila, Helsinki (FI); Jorma Mustalahti, Helsinki (FI); Otto Lanz, Helsinki (FI); Janne Laine, Helsinki (FI); Aki Haikonen, Helsinki (FI); Anssi Venho, Helsinki (FI); Mikko Kukkola, Helsinki (FI); Wen Sheng Luo, Helsinki (FI); XueSong Pan, Helsinki (FI); Kai Guo, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/329,983

(22) Filed: Jun. 6, 2023

(65) Prior Publication Data

US 2023/0322522 A1 Oct. 12, 2023

Related U.S. Application Data

(63) Continuation of application No. PCT/EP2020/087592, filed on Dec. 22, 2020.

(51) Int. Cl.

*B66B 11/00* (2006.01)
*B66B 1/34* (2006.01)
*B66B 19/00* (2006.01)

(52) U.S. Cl.

CPC ........ *B66B 11/0045* (2013.01); *B66B 1/3423* (2013.01); *B66B 11/006* (2013.01); *B66B 19/00* (2013.01)

(58) Field of Classification Search

CPC ...... B66B 11/0045; B66B 19/00; B66B 19/04
See application file for complete search history.

(56) References Cited

U.S. PATENT DOCUMENTS 7,108,100 B2 * 9/2006 Stingl ..................... E04G 1/367 248/235
8,813,432 B2 * 8/2014 Wurth .................. E04G 21/163 52/283

(Continued)

FOREIGN PATENT DOCUMENTS

EP 3617127 A1 3/2020
JP H04129981 A 4/1992

(Continued)

OTHER PUBLICATIONS

International Search Report and Written Opinion for International Application No. PCT/EP2020/087592 dated Aug. 20, 2021.

*Primary Examiner* — Michael R Mansen
*Assistant Examiner* — Michelle M Mudwilder
(74) *Attorney, Agent, or Firm* — Harness, Dickey & Pierce. P.L.C.

(57) ABSTRACT

The invention relates to a construction arrangement of an elevator, comprising a hoistway in a building, the hoistway comprising a hoistway opening, the opening delimited by lower and upper edge structures; a load in the hoistway lower than said opening; a hoisting arrangement for hoisting said load, said hoisting arrangement comprising a support structure higher than said load; a hoisting device; and flexible tension member connected to said load; the flexible tension member being movable with said hoisting device to hoist the load by a hoisting force. Said support structure comprises an anchoring beam structure comprising a lower end engaging the lower edge structure, and an upper end engaging the upper edge structure; and a support beam structure connected to the anchoring beam structure, pro- (Continued)

truding from the anchoring beam structure into the hoistway; said flexible tension member hanging in the hoistway supported by the support beam structure.

17 Claims, 9 Drawing Sheets

(56) References Cited

U.S. PATENT DOCUMENTS

| | | | | |
|---|---|---|---|---|
| 9,388,020 | B2 * | 7/2016 | Peacock | B66B 19/007 |
| 11,598,106 | B2 * | 3/2023 | Garbers | B66B 19/00 |
| 2011/0024231 | A1 * | 2/2011 | Wurth | E04G 5/10<br>182/115 |
| 2018/0290863 | A1 * | 10/2018 | Peacock | E04G 3/32 |

FOREIGN PATENT DOCUMENTS

| | | | | | |
|---|---|---|---|---|---|
| JP | 04161561 | A | * | 6/1992 | |
| JP | 2001354374 | A | | 12/2001 | |
| JP | 2007169011 | A | * | 7/2007 | |
| WO | WO-2007015275 | A1 | * | 2/2007 | B66B 19/00 |

* cited by examiner

CONSTRUCTION ARRANGEMENT OF AN ELEVATOR AND METHOD

CROSS-REFERENCE TO RELATED APPLICATION

This application is a continuation of PCT International Application No. PCT/EP2020/087592 which has an International filing date of Dec. 22, 2020, the entire contents of which are incorporated herein by reference.

FIELD OF THE INVENTION

The invention relates to a construction arrangement of an elevator and a method for constructing an elevator. The elevator is preferably an elevator for transporting passengers and/or goods.

BACKGROUND OF THE INVENTION

During construction of an elevator, elevator parts need to be moved in the hoistway vertically for various reasons. For instance, in a construction phase of a machine-roomless elevator, an elevator car may need to be positioned in a certain position high above the hoistway floor. In a construction step of a jump-lift, on the other hand, a machine room may be needed to be hoisted to a higher position. Likewise, various other loads may need to be moved to their intended positions above the hoistway floor during construction of an elevator.

In prior art, an option to move loads in the hoistway has been to use a temporary hoisting arrangement located inside the hoistway. This is advantageous, inter alia, because it allows performing the hoisting action independently of a building crane.

In connection with so-called jump-lifts, the bottom part of an elevator hoistway is taken into use before the building has been completed. The upper parts of the building as well as the top part of the elevator hoistway can be constructed at the same time as an elevator moving in the bottom part of the elevator hoistway already serves people on the lower floors of the building under construction. Typically in jump-lifts, the elevator car moving in the lower parts of the elevator hoistway is supported and moved during construction-time use with a hoisting machine. The hoisting machine is typically supported on a movable machine room which is vertically movable in the elevator hoistway or it may be mounted on some other structure temporarily so that it can be moved later to a higher position as the construction work progresses. In connection with jump-lifts, the hoisting machine or the structure carrying the hoisting machine, i.e. the movable machine room, is a load that needs to be hoisted during the method. There are prior jump-lifts where, in order to hoist this load, a temporary hoisting arrangement is arranged to pull the load to be hoisted by taking support from a platform or an equivalent support structure mounted in the hoistway above the load to be hoisted, wherein the support structure has been mounted in its place such that it rests on top of openings such as pockets, which are disposed on opposite sides of the hoistway. A jump-lift of this kind has been disclosed in document EP2636629, for instance. In this solution, a support structure has been mounted in the hoistway above the load to be hoisted, and the load to be hoisted is a movable machine room of the jump-lift.

A drawback of prior solutions has been that the hoisting arrangement is difficult to safely install in its place. Moreover, dismantling and later position changes to a higher position in the hoistway have been correspondingly difficult. This is relevant particularly in connection with so called jump-lifts where repetitive position changes are part of the process. A drawback has been that finding support points for the platform in the hoistway is sometimes difficult, and may necessitate special arrangements such as forming pockets in advance in the hoistway walls and/or use of structures, such as guide rails, built in the hoistway as support points. These options may not be available in every site and every elevator solution, which sets challenges for finding a reliable all-round hoisting arrangement suitable for different sites.

In connection with so called normal elevator installation projects where the elevator is constructed straightaway into its final height and only thereafter taken into use, the "temporary" hoisting arrangement may be needed to hoist loads that need to be moved in the hoistway, e.g. to hoist an elevator car to the upper end of its intended traveling zone. This may be advantageous since in this way a hoisting roping is easy to install. A counterweight may be in the lower end of its traveling zone, and since the car and counterweight are in their opposite extreme positions their positions relative to each other is simple to set to be right when interconnecting them by the hoisting roping. Hoisting the car may also be advantageous and/or needed due to additional or alternative reasons. For instance, in some methods, installation work at different levels is performed working on top of the car. For instance, in installation process of a machine-roomless elevator by working on top of the car it is possible to manually guide the roping to pass around the drive wheel of a hoisting machine mounted in the upper end of the hoistway and/or to perform other adjustment work related to the hoisting machine. There are prior solution where the "temporary" hoisting arrangement for hoisting the car comprises a hoisting device arranged to pull the load to be hoisted taking support from the ceiling of the hoistway. A drawback is that hoisting work may be needed already before the ceiling is ready to be used as a supporting structure. Also, preparing the support point may be difficult and/or necessitate use of scaffoldings.

BRIEF DESCRIPTION OF THE INVENTION

The object of the invention is to introduce an improved construction arrangement of an elevator and an improved method for constructing an elevator. An object is particularly to introduce a solution by which one or more of the above defined problems of prior art and/or drawbacks discussed or implied elsewhere in the description can be solved.

An object is particularly to provide an arrangement and a method whereby a relatively heavy load can be hoisted in a hoistway of an elevator and which is simple, swift and safe to arrange. An object is moreover to provide an arrangement and a method whereby support for the hoisting can be taken simply and reliably in most elevator construction sites. An object is moreover to provide an arrangement and a method wherein the arrangement is simple, swift and safe to dismantle and move to a new location. An object is moreover to provide an arrangement and a method wherein the equipment can be simply reused in some other elevator construction site. An object is moreover to provide an arrangement and a method wherein multiple functions can be simply integrated into the same equipment of the hoisting arrangement.

It is brought forward a new construction arrangement of an elevator, comprising a hoistway formed in a building, the hoistway comprising at least one hoistway opening leading in horizontal direction out from the hoistway, the opening being delimited by a lower edge structure and an upper edge structure; and a load in the hoistway lower than said opening; and a hoisting arrangement for hoisting said load. Said hoisting arrangement comprises a support structure mounted higher than said load; and a hoisting device; and at least one flexible tension member connected or at least connectable to said load; wherein the at least one flexible tension member is movable with said hoisting device in particular for thereby transmitting a hoisting force to said load to be hoisted. Said support structure comprises an anchoring beam structure comprising a lower end engaging the lower edge structure, in particular a face thereof, and an upper end engaging the upper edge structure, in particular a face thereof; and a support beam structure connected to the anchoring beam structure and protruding from the anchoring beam structure into the hoistway; and wherein said at least one flexible tension member hangs in the hoistway supported by the support beam structure.

With this kind of solution one or more of the above mentioned objects can be achieved.

Preferable further details of the construction arrangement are introduced in the following, which further details can be combined with the construction arrangement individually or in any combination.

In a preferred embodiment, said load is an elevator car or a load positioned above an elevator car disposed in the hoistway. Alternatively, said load could be some other load such as a vertically movable protection deck or a vertically movable working platform, for instance.

In a preferred embodiment, the aforementioned load positioned above an elevator car disposed in the hoistway comprises a hoisting machine and/or a structure carrying a hoisting machine.

In a preferred embodiment, the load (9) positioned above an elevator car is a movable machine room comprising a hoisting machine (9*a*) and a structure (9*b*) carrying a hoisting machine (9*a*), the structure (9*b*) carrying a hoisting machine (9*a*) being mountable in different positions in the hoistway (2).

In a preferred embodiment, the whole weight of said load is carried by said at least one flexible tension member, i.e. whatever the number of flexible members is movable with said hoisting device. Hereby, small amount of devices and structures are needed to provide support for the hoisting.

In a preferred embodiment, the whole weight of said load is arranged to be moved upwards by drive force produced by the hoisting device. Hereby, small amount of devices and structures are needed for the hoisting. The support structure, in particular the structure and mounting thereof, facilitates this goal.

In a preferred embodiment, the building comprises a first floor and a second floor above the first floor, and the lower edge structure is an edge structure of the first floor and the upper edge structure is an edge structure of the second floor.

In a preferred embodiment, the hoisting device is disposed in the space delimited by said floors between them. This position is advantageous since facilitates easy installation of the hoisting device, because it can be installed together with the support structure. This position is also commonly easily accessible for workers.

In a preferred embodiment, the space is preferably accessible also via at least one other access route than said opening. This facilitates simplicity of installation of the hoisting arrangement since several components thereof can be brought simply in vicinity of their mounting positions. Said at least one other route preferably comprises

- an opening leading in horizontal direction out from the space 6 into exterior of the building, possibly into a construction time elevator mounted against the outside of the building; and/or
- an opening leading in vertical direction out from the space 6, such as into some other floor space of the building; and/or
- an elevator car of an earlier installed elevator which car is movable to be level with the space.

In a preferred embodiment, the at least one flexible tension member extends downwards from the support beam structure in the hoistway towards said load to which it is connected or at least connectable.

In a preferred embodiment, the construction arrangement comprises an operating device comprising an interface operable by a user for inputting drive commands of a hoisting device, said hoisting device being the aforementioned hoisting device of the hoisting arrangement or a second hoisting device, the operating device being configured to transmit a wireless drive signal in response to a command inputted by the user; and a relay station; wherein the relay station configured to relay wireless drive signals from the operating device to the hoisting device. This provides that the hoisting device in question can be controlled remotely by a user even when the distance is long.

In a preferred embodiment, the relay station is mounted closer to the hoisting device than where the operating device is disposed.

In a preferred embodiment, the operating device is mounted on the support structure or at least in its vicinity.

In a preferred embodiment, the operating device comprises a controller configured to communicate wirelessly with a controller of the relay station and the controller of the relay station is configured to communicate wirelessly with a controller of the hoisting device in question.

In a preferred embodiment, the operating device comprises a controller, the relay station comprises a controller and the hoisting device (i.e. the hoisting device in question; 12 or 19) comprises a controller. Each said controller is preferably an electronic device suitable for wireless communication. The controller of the operating device preferably comprises a signal transmitter, the controller of the relay station preferably comprises a signal receiver and a signal transmitter, and the controller of the hoisting device preferably comprises a signal receiver.

In a preferred embodiment, operating device is lower than the support structure and said relay station.

In a preferred embodiment, operating device is portable and/or carried by a structure which is inside the hoistway and lower than the support structure and said relay station, said structure preferably being the load.

In a preferred embodiment, the construction arrangement moreover comprises a second hoisting device inside the hoistway and mounted on the support structure, and at least one second flexible tension member wherein the at least one flexible tension member is movable with said second hoisting device. The second hoisting device is advantageous since it provides that, in addition to hoisting operations performed with the aforementioned hoisting device, also other hoisting operations can be performed, which may be simultaneous or different in type. A hook or some other engagement device, in particular engagable with an object to be hoisted, is preferably carried by the at least one second flexible tension member. Preferably, the construction arrangement comprises an operating device comprising an interface, such as one including a touch screen or buttons, which interface is operable by a user for inputting drive commands of the second hoisting device, the operating device being configured to transmit a wireless drive signal in response to a command inputted by the user; and a relay station; wherein the relay station configured to relay wireless drive signals from the operating device to the second hoisting device.

In a preferred embodiment, said support structure comprises a diverting wheel arrangement mounted on the support beam structure, and the tension member is arranged to pass from the hoisting device to a diverting wheel of the diverting wheel arrangement, the diverting wheel being arranged to guide the tension member to pass downwards in the hoistway towards load to which it is connected or at least connectable. Preferably, the diverting wheel is at a horizontal distance from the walls of the hoistway, within the central area of the vertical projection of the hoistway, wherein the central area is the central third of the width and depth of the vertical projection of the hoistway.

In a preferred embodiment, said lower end of the anchoring beam structure comprises a first support member engaging the lower edge structure and said upper end of the anchoring beam structure comprises a second support member engaging the upper edge structure.

In a preferred embodiment, the first support member is fixed immovably to the lower edge structure and the second support member is fixed immovably to the upper edge structure, preferably by releasable fixing means, such as releasable fixing means comprising one or more bolts. The bolts may be anchor bolts, for instance anchored in holes formed in the lower and upper edge structure, for example. The releasable fixing means preferably moreover comprise nut members screwable on the bolts.

In a preferred embodiment, the anchoring beam structure comprises one or more beams, in particular extending between the lower end and the upper end, the height of which one or more beams can be increased for tightening the lower end to press against the lower edge structure, in particular against a face thereof, and the upper end to press against the upper edge structure, in particular against a face thereof.

In a preferred embodiment, said one or more beams comprise a pivotal beam mounted pivotally around an axis the height being increasable by pivoting said pivotal beam around said axis towards a first pivoting direction.

In a preferred embodiment, said pivotal beam is mounted pivotally on a first support member engaging the lower edge structure.

In a preferred embodiment, the pivotal beam is mounted in such a position that pivoting around said axis towards a first pivoting direction moves its upper end upwards and towards the hoistway.

In a preferred embodiment, the pivotal beam is mounted in such a position that said upper end of the pivotal beam is higher and on the opposite horizontal side of the an axis than the hoistway, whereby said upper end of the pivotal beam moves in said pivoting upwards and towards the hoistway.

In a preferred embodiment, the support structure comprises a tensioner, such as a bracket or a flexible tension member or a pulling device, or 2 or more of these, which tensioner is connected between a connection point of the support beam structure and the pivotal beam, the tensioner being tensioned or tensionable to pull the pivotal beam to turn towards said first pivoting direction.

In a preferred embodiment, the connection point is within the vertical projection of the hoistway.

In a preferred embodiment, the connection point is on a fixed structure of a support beam of the support beam structure.

In a preferred embodiment, movement of the support beam structure such that the connection point moves downwards is arranged to tension the tensioner.

In a preferred embodiment, the support beam structure is connected to the aforementioned lower end of the anchoring beam structure, preferably to a first support member thereof, which first support member is fixed immovably to the lower edge structure. The support beam structure preferably protrudes from the lower end of the anchoring beam structure in particular from the first support member thereof, into the hoistway.

In a preferred embodiment, the support beam structure comprises a support beam. The support beam is preferably mounted on the aforementioned anchoring beam structure, preferably on a first support member thereof fixed immovably to the lower edge structure. The support beam is preferably mounted on the anchoring beam structure, preferably on the aforementioned first support member thereof, pivotally around a horizontal axis x2. Thus, it is pivotal around a horizontal axis x2 relative to the anchoring beam structure.

In a preferred embodiment, the support beam structure is extendable and retractable.

In a preferred embodiment, the support structure comprises a third support member engaging a structure of the opposite side of the hoistway than the opening, and a second support beam structure protruding from the third support member towards the support beam structure, these being connected to each other, the connection point preferably being within the central area of the vertical projection of the hoistway. Preferably, the third support member is fixed immovably to the structure.

In a preferred embodiment, the hoisting device is a device suitable for pulling a flexible member, the hoisting device preferably comprising a motor and an engaging member, such as a drum or roller for example, which engaging member is engageable with the flexible member and rotatable with the motor.

In a preferred embodiment, the face of the lower edge structure engaged by the lower end faces upwards, and the face of the upper edge structure engaged by the upper end faces downwards or outwards from the hoistway.

In a preferred embodiment, the face of the lower edge structure engaged by the lower end is horizontal, and the face of the upper edge structure engaged by the upper end is vertical or horizontal. The orientations as defined provide a reliable and firm support for the anchoring beam structure.

In a preferred embodiment, the construction arrangement comprises said building.

In a preferred embodiment, the opening is at least 1.8 meters high.

It is also brought forward a new method for constructing an elevator, the method comprising providing a construction arrangement as defined anywhere above or in any of the claims of this application, and hoisting the load in the hoistway with the hoisting arrangement.

With this kind of solution one or more of the above mentioned objects can be achieved.

Preferable further details of the method are introduced in the following, which further details can be combined with the method individually or in any combination.

In a preferred embodiment, said load is an elevator car or a load, such as preferably a movable machine room, positioned above an elevator car disposed in the hoistway.

In a preferred embodiment, said load is an elevator car, and the method comprises hoisting the elevator car in the hoistway with the hoisting arrangement, and thereafter suspending the elevator car with a hoisting roping. After said suspending the method preferably comprises removing the hoisting arrangement.

In a preferred embodiment, said load is a movable machine room positioned above an elevator car disposed in the hoistway.

In a preferred embodiment, said load is a movable machine room positioned above an elevator car disposed in the hoistway and the method comprises using the elevator car for transporting passengers and/or goods below the movable machine room in particular while the machine room is mounted in a first position and suspends the elevator car below it via a hoisting roping; and thereafter hoisting the movable machine room with the hoisting arrangement from said first position to a higher second position, and thereafter using the elevator car for transporting passengers and/or goods below the movable machine room in particular while the machine room is mounted in a second position and suspends the elevator car below it via a hoisting roping.

BRIEF DESCRIPTION OF THE DRAWINGS

In the following, the present invention will be described in more detail by way of example and with reference to the attached drawings, in which

FIG. 2 illustrates further preferred details of the construction arrangement A of

FIG. 1.

The foregoing aspects, features and advantages of the invention will be apparent from the drawings and the detailed description related thereto.

DETAILED DESCRIPTION

Figure 1:
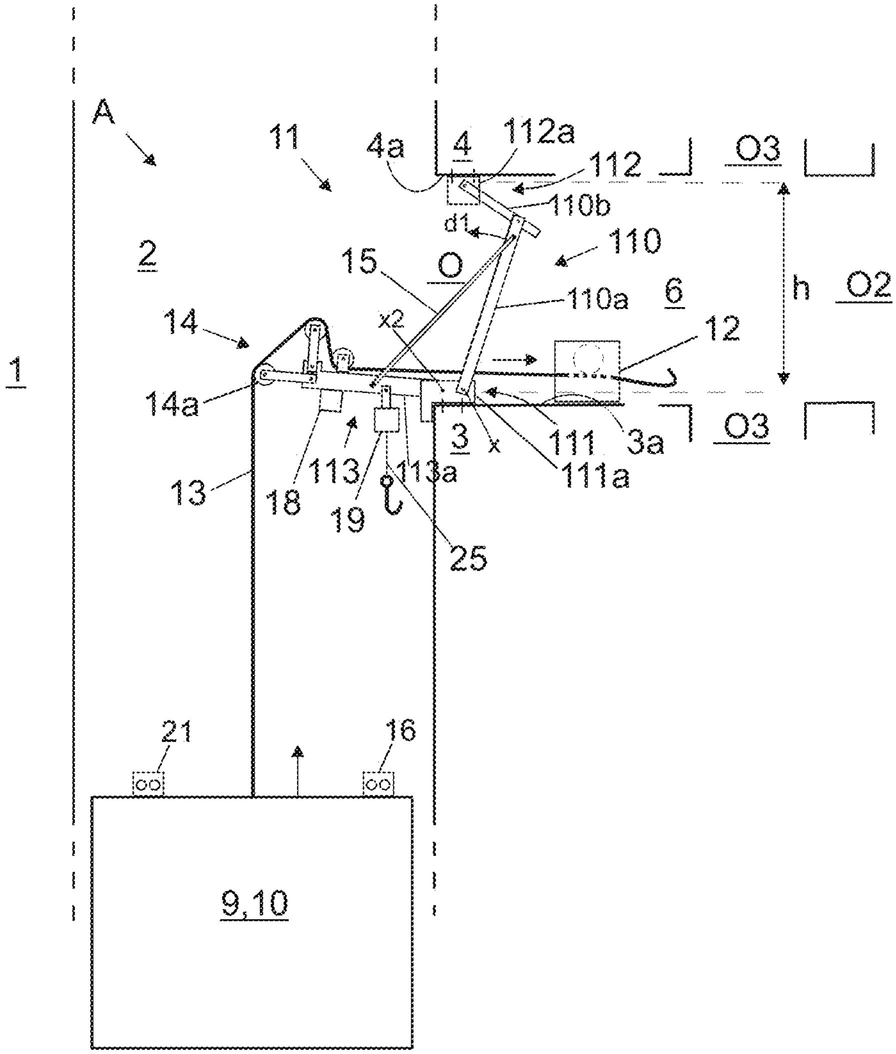
FIG. 1 illustrates a construction arrangement A of an elevator according to a first embodiment.

FIG. 1 illustrates a construction arrangement of an elevator according to a first embodiment. The arrangement comprises a building 1 and a hoistway 2 formed in the building 1, the hoistway 2 comprising at least one hoistway opening O leading in horizontal direction out from the hoistway 2. The opening O is delimited by a lower edge structure 3 and an upper edge structure 4. The arrangement further comprises a load 9,10 in the hoistway 1 lower than said opening O and a hoisting arrangement A for hoisting said load 9,10. Said hoisting arrangement A comprises a support structure 11 mounted higher than said load 9,10; and a hoisting device 12; and a flexible tension member 13.

The flexible tension member 13 is in FIG. 1 connected to said movable load 9,10, and movable with said hoisting device 12 in particular for thereby transmitting an upwards pulling hoisting force to said load 9,10 to be hoisted. The flexible tension member 13 extends downwards from the support beam structure 113 in the hoistway 2 towards said load 9,10.

Said support structure 11 comprises an anchoring beam structure 110 comprising a lower end 111 engaging the lower edge structure 3, in particular a face 3*a* thereof, and an upper end 112 engaging the upper edge structure 4, in particular a face 4*a* thereof; and a support beam structure 113 connected to the anchoring beam structure 110 and protruding from the anchoring beam structure 110 into the hoistway 2. Said at least one flexible tension member 13 hangs in the hoistway supported by the support beam structure 113. The anchoring provided in this way facilitates firmness and reliability of mounting of a support structure supported by which a tension member can hang in the hoistway. The anchoring provided in this way also facilitates that a hoisting can be performed simply since efficient utilization of building floors is facilitated.

Preferably, the building 1 comprises a first floor 3 and a second floor 4 above the first floor 3, and the lower edge structure is an edge structure of the first floor 3 and the upper edge structure is an edge structure of the second floor 4. Preferably, the hoistway opening 5 leads from the hoistway 2 to a space 6 delimited by said floors 3,4 between them. The space 6 is preferably accessible also via at least one other access route than said opening O. Said at least one other route preferably comprises

- an opening O2 leading in horizontal direction out from the space 6 into exterior of the building 1, possibly into a construction time elevator mounted against the outside of the building; and/or
- an opening O3 leading in vertical direction out from the space 6, such as into some other floor space of the building 1; and/or
- an elevator car of an earlier installed elevator which car is movable to be level with the space 6.

Said load 9,10 is preferably an elevator car or a load positioned above an elevator car disposed in the hoistway 2. The load positioned above an elevator car disposed in the hoistway 2 can advantageously be a hoisting machine or a structure carrying the hoisting machine, such as a movable machine room in particular. In the latter case, the elevator would preferably be a so-called jump-elevator. The load could, as a yet another alternative, be a working platform or possibly any elevator component to be installed.

In the embodiment of FIG. 1, the whole weight of said load 9,10 is carried by the flexible tension member 13. Likewise, in the preferred embodiment of FIG. 1, the whole weight of said load 9,10 is arranged to be moved upwards by drive force produced by the hoisting device 12. Thus, in this embodiment, there is no need for additional flexible tension members 13 or hoisting devices, although this option is also possible since it might in some case be regarded advantageous.

In the embodiment of FIG. 1, the hoisting device 12 is disposed in a space 6 delimited by said floors 3,4 between them. This position is advantageous since facilitates easy installation of the hoisting device 12, because it can be installed together with the support structure 11. Also, the installation does not necessitate much of work to be done inside the hoistway 2. This position is, however, not necessary since the flexible member 13 could be routed to some other location.

In the embodiment of FIG. 1, the flexible tension member 13 is connected with 1:1 hoisting ratio. This is, however, not necessary since a different hoisting ratio could alternatively be used, e.g. 1:2 or 1:4 for example, which can be achieved for example, by utilizing diverting wheels to change the hoisting ratio.

In the embodiment of FIG. 1, the support structure 11 comprises a diverting wheel arrangement 14 mounted on the support beam structure 113, and the tension member 13 is arranged to pass from the hoisting device 12 to a diverting wheel 14*a* of the diverting wheel arrangement 14, the diverting wheel 14*a* being arranged to guide the tension member 13 to pass downwards in the hoistway 2 towards load 8,9,10 to which it is connected or at least connectable.

The diverting wheel 14*a* is at a horizontal distance from the walls of the hoistway 2, within the central area of the vertical projection of the hoistway 2, wherein the central area is the central third of the width and depth of the vertical projection of the hoistway 2.

Preferable features relating to anchoring of the anchoring beam structure 110 are described in the following. Said lower end 111 of the anchoring beam structure 110 comprises a first support member 111*a* engaging the lower edge structure 3 and said upper end 112 comprises a second support member 112*a* engaging the upper edge structure 4. The first support member 111*a* is fixed immovably to the lower edge structure 3 and the second support member 112*a* is fixed immovably to the upper edge structure 4. The fixing is preferably by releasable fixing means, such as releasable fixing means comprising one or more bolts b. The bolts can be anchor bolts b anchored in holes formed in the edge structures 3 and 4, for example. The releasable fixing means preferably moreover comprise nut members screwable on the bolts. Then, the support members 111*a* and 111*b* preferably have openings, and the support members 111*a* and 111*b* are positioned such that said anchor bolts extend through said openings and the nut members are screwed on the anchor bolts and tightened to fix the support members 111*a* and 111*b* tightly against the edge structures 3,4. In the embodiment of FIG. 1, the support beam structure 113 is connected to the aforementioned lower end 111 of the anchoring beam structure 110, in particular to the first support member 111*a* thereof, which first support member 111*a* is fixed immovably to the lower edge structure 3. The support beam structure 113 protrudes from the lower end 111 of the anchoring beam structure 110, in particular from the first support member 111*a* thereof, into the hoistway.

In the embodiment of FIG. 1, the anchoring beam structure 110 comprises beams 110*a*,110*b* between the lower end 110 and the upper end 111, which beams are connected to each other such that the height h (i.e. here the total height) of the beams 110*a*,110*b* can be increased, in particular for tightening the lower end 111 to press against the lower edge structure 3, in particular against a face 3*a* thereof, and the upper end 112 to press against the upper edge structure 4, in particular against a face 4*a* thereof.

In the embodiment of FIG. 1, said beams 110*a*,110*b* comprise a pivotal beam 110*a* mounted pivotally around an axis x the aforementioned height being increasable by pivoting said pivotal beam 110*a* around said axis x towards a first pivoting direction d1. In the embodiment of FIG. 1, said pivotal beam 110*a* mounted pivotally on a first support member 111*a* engaging the lower edge structure 3. The pivotal beam 110*a* is mounted in such a position that pivoting around said axis x towards a first pivoting direction d1 moves its upper end upwards and towards the hoistway 1. For facilitating this, the pivotal beam 110*a* is mounted in such a position that said upper end of the pivotal beam 110*a* is higher and on the opposite horizontal side of the an axis x than the hoistway, whereby said upper end of the pivotal beam 110*a* moves in said pivoting upwards and towards the hoistway 1.

For facilitating keeping tightness of the anchoring, the support structure 11 preferably comprises a tensioner 15. The tensioner 15 can be a bracket or a flexible tension member as illustrated in FIG. 1, or alternatively it could be a pulling device. The tensioner 15 is connected between a connection point p of the support beam structure 113 and the pivotal beam 110*a* of the anchoring beam structure 110, the tensioner 15 being tensioned or at least tensionable to pull the pivotal beam to turn towards said first pivoting direction d1. Movement of the support beam structure 113 such that the connection point p moves downwards is arranged to tension the tensioner 15. In FIG. 1, the weight of the load is arranged to exert a force on the support beam structure 113 which force pulls the support beam structure 113 downwards such that the tensioner 15 is tensioned by force exerted by the load on the support beam structure 113 to pull the pivotal beam to turn towards said first pivoting direction d1. The connection point p is in particular such that it is within the vertical projection of the hoistway 2. The connection point p is in particular such that it is on a part of a support beam 113*a* of the support beam structure 113.

Preferred details of the support beam structure 113 of the embodiment of FIG. 1 are described hereinafter. The support beam structure 113 comprises a support beam 113*a*. The support beam 113*a* is mounted on the anchoring beam structure 110, in particular on a first support member 111*a* thereof fixed immovably to the lower edge structure 3. The support beam (113*a*) is mounted on the anchoring beam structure (110, in particular on first support member 111*a* thereof, pivotally around a horizontal axis x2. Thus, it is pivotal around a horizontal axis x2 relative to the anchoring beam structure 110.

The support beam structure 113 is extendable and retractable. This ability provides suitability to different hoistways and/or adjustment of position where the tension member 13 rises from below to meet the support structure 11. This ability may be implemented telescopically.

In the embodiment of FIG. 1, the construction arrangement comprises an operating device 16 comprising an interface 17, such as one including a touch screen or buttons 22*a*, which interface 17 is operable by a user for inputting drive commands of the hoisting device 12, the operating device 16 being configured to transmit a wireless drive signal in response to a command inputted by the user; and a relay station 18; wherein the relay station 18 is configured to relay wireless drive signals from the operating device 16 to the hoisting device 12. The relay station 18 is mounted closer to the hoisting device 12 than the operating device 16. This provides that the hoisting device 12 can be controlled remotely by a user even when the distance is long.

In the presented embodiments, the relay station 18 is mounted on the support structure 11.

In the embodiments of FIGS. 1, the operating device 16 is lower than the support structure 11 and said relay station 18. The operating device 16 is preferably portable and/or carried by a structure 9,10 which is inside the hoistway 2 and lower than the support structure 11 and said relay station 18. Said structure which is inside the hoistway 2 is in the illustrated examples the load 9,10.

Figure 7:
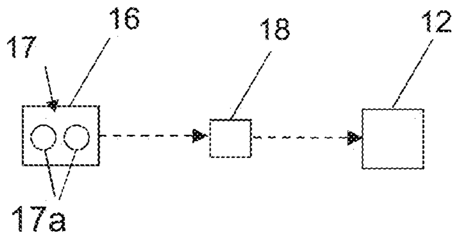
FIG. 7 illustrates preferred details of connections of an operating device, a relay station and a hoisting device.

FIG. 7 illustrates preferred details of connections of the operating device 16, the relay station 18 and the hoisting device 12.

Figure 8:
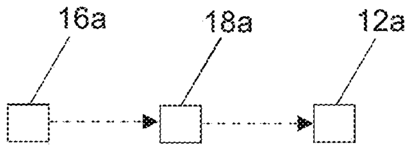
FIG. 8 illustrates preferred details of an operating device, a relay station, a hoisting device and connections of FIG. 7.

FIG. 8 illustrates preferred details of connections of FIG. 7. In this case, the operating device 16 comprises a controller 16*a*, the relay station 18 comprises a controller 18*a* and the hoisting device comprises a controller 12*a*. The controller 16*a* of the operating device 16 is configured to communicate wirelessly with the controller 18*a* of the relay station 18 and the controller 18*a* of the relay station 18 is configured to communicate wirelessly with the controller 12*a* of the hoisting device. Each said controller 16*a*,18*a*,12*a* is preferably an electronic device suitable for wireless communication. The controller 16*a* preferably more specifically comprises a signal transmitter, the controller 18*a* preferably more specifically comprises a signal receiver and a signal transmitter, and the controller 12 preferably more specifically comprises a signal receiver.

In the embodiment of FIG. 1, the construction arrangement moreover comprises a second hoisting device 19 inside the hoistway (2) and mounted on the support structure (11), and at least one second flexible tension member (25) wherein the at least one flexible tension member (25) is movable with said second hoisting device (19). The second hoisting device 19 is advantageous since it provides that in addition to hoisting operations performed with the hoisting device 12 additional hoisting operations can be performed, which may be simultaneous or different in type, e.g. in terms of safety requirements, lifting speed and/or required nominal load. In particular, the second hoisting device 19 is simply usable for hoisting objects to be installed which are smaller and/or lighter than said load 9,10, such as guide rails or hoistway door components for example.

A hook or some other engagement device, in particular engagable with an object to be hoisted, is preferably carried by the at least one second flexible tension member 25.

The construction arrangement comprises an operating device 21 comprising an interface 22, such as one including a touch screen or buttons 22*a*, which interface 22 is operable by a user for inputting drive commands of the second hoisting device 19, the operating device 21 being configured to transmit a wireless drive signal in response to a command inputted by the user; and a relay station 18; wherein the relay station 18 configured to relay wireless drive signals from the operating device 21 to the second hoisting device 19. The operating device 21 is preferably portable and/or carried by a structure 9,10 which is inside the hoistway 2 and lower than the support structure 11 and said relay station 18. Said structure which is inside the hoistway 2 is in the illustrated examples the load 9,10.

The operating device 21 is in Figures a different device than the aforementioned operating device 16, but they could alternatively be the same device. In this case, preferably the same relay station 18 would preferably be configured to relay wireless drive signals from the operating device 16,21 to the hoisting device 12 and the second hoisting device 19. The interfaces 22 and 17 can also be the same interface, i.e. drive commands of both of the hoisting devices 12 and 19, could be inputted via the same interface.

Figure 9:
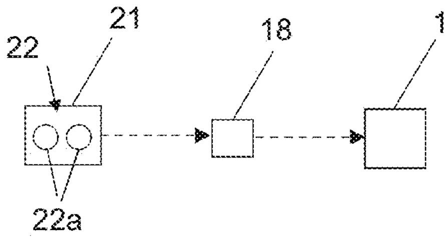
FIG. 9 illustrates preferred details of connections of an operating device, a relay station and a second hoisting device.

FIG. 9 illustrates preferred details of connections of the operating device 21, the relay station 18 and the second hoisting device 19.

Figure 10:
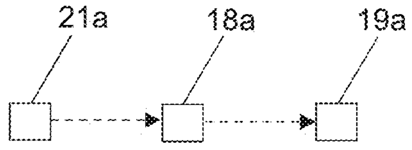
FIG. 10 illustrates preferred details of an operating device, a relay station, a second hoisting device and connections of FIG. 9.

FIG. 10 illustrates preferred details of connections of FIG. 9. In this case, the operating device 21 comprises a controller 21*a*, the relay station 18 comprises a controller 18*a* and the hoisting device comprises a controller 19*a*. The controller 21*a* of the operating device 21 is configured to communicate wirelessly with the controller 18*a* of the relay station 18 and the controller 18*a* of the relay station 18 is configured to communicate wirelessly with the controller 19*a* of the second hoisting device 19. Each said controller 21*a*,18*a*,19*a* is preferably an electronic device suitable for wireless communication. The controller 21*a* preferably more specifically comprises a signal transmitter, the controller 18*a* preferably more specifically comprises a signal receiver and a signal transmitter, and the controller 19*a* preferably more specifically comprises a signal receiver.

Figure 3:
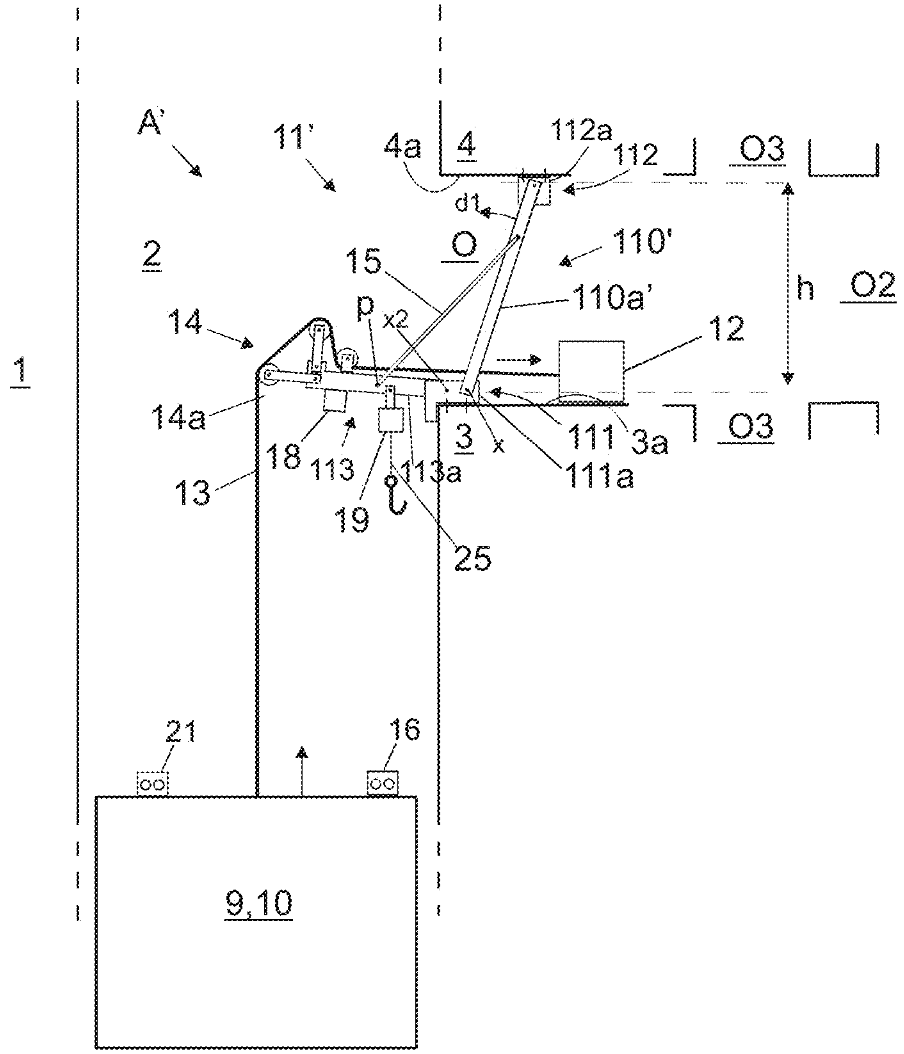
FIG. 3 illustrates a construction arrangement A of an elevator according to a second embodiment.

FIG. 3 illustrates a construction arrangement A' of an elevator according to a second embodiment. This embodiment is otherwise similar to what is shown in and described referring to FIG. 1, but the upper parts of the anchoring beam structure 110' of the support structures 11' of this embodiment is different than that in FIG. 1. In the embodiment of FIG. 3, the anchoring beam structure 110' comprises a single beam 110*a'* between the lower end 111 and the upper end 112. The height h (i.e. here the total height) of the beams 110*a'* can be increased, in particular for tightening the lower end 111 to press against the lower edge structure 3, in particular against a face thereof, and the upper end 112 to press against the upper edge structure 4, in particular against a face thereof.

In the embodiment of FIG. 3, said beam 110*a'* is a pivotal beam mounted pivotally around an axis x the aforementioned height being increasable by pivoting said pivotal beam 110*a'* around said axis x towards a first pivoting direction d1. In the embodiment of FIG. 3, said pivotal beam 110*a'* is mounted pivotally on a first support member 111*a*, which first support member 111*a* engages the lower edge structure 3. The pivotal beam 110*a'* is mounted in such a position that pivoting around said axis x towards a first pivoting direction d1 moves its upper end upwards and towards the hoistway 1. For facilitating this, the pivotal beam 110*a'* is mounted in such a position that said upper end of the pivotal beam 110*a'* is higher and on the opposite horizontal side of the an axis x than the hoistway 2, whereby said upper end of the pivotal beam 110*a'* moves in said pivoting upwards and towards the hoistway 2. With regard to other features than the differences mentioned above, their structures and functions are described referring to FIG. 1.

Figure 4:
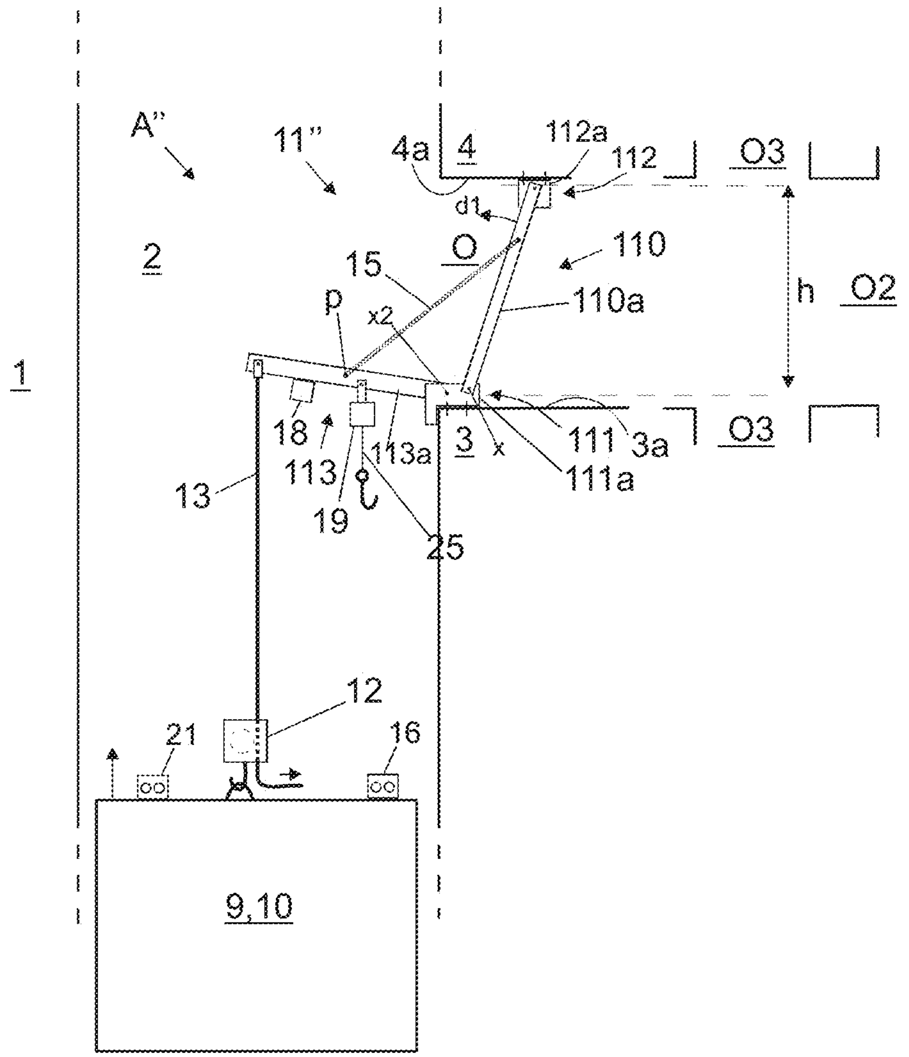
FIG. 4 illustrates a construction arrangement A of an elevator according to a third embodiment.

FIG. 4 illustrates a construction arrangement of an elevator according to a third embodiment. This embodiment is otherwise similar to what is shown in and described referring to FIG. 3, but the hoisting device 12 is differently positioned and the flexible tension member 13 is also differently routed, and the support structure 11" is otherwise similar to the support structure 11' of FIG. 3 but there is no diverting wheel arrangement 14. In this embodiment, the flexible tension member 13 is fixed to the support structure 11", in particular to the support beam 113 thereof and the hoisting device 12 is mounted on the load 9,10 and arranged to pull the load 9,10 upwards by pulling the flexible member 13. With regard to other features than the differences mentioned above, their structures and functions are described referring to FIG. 3.

Figure 5:
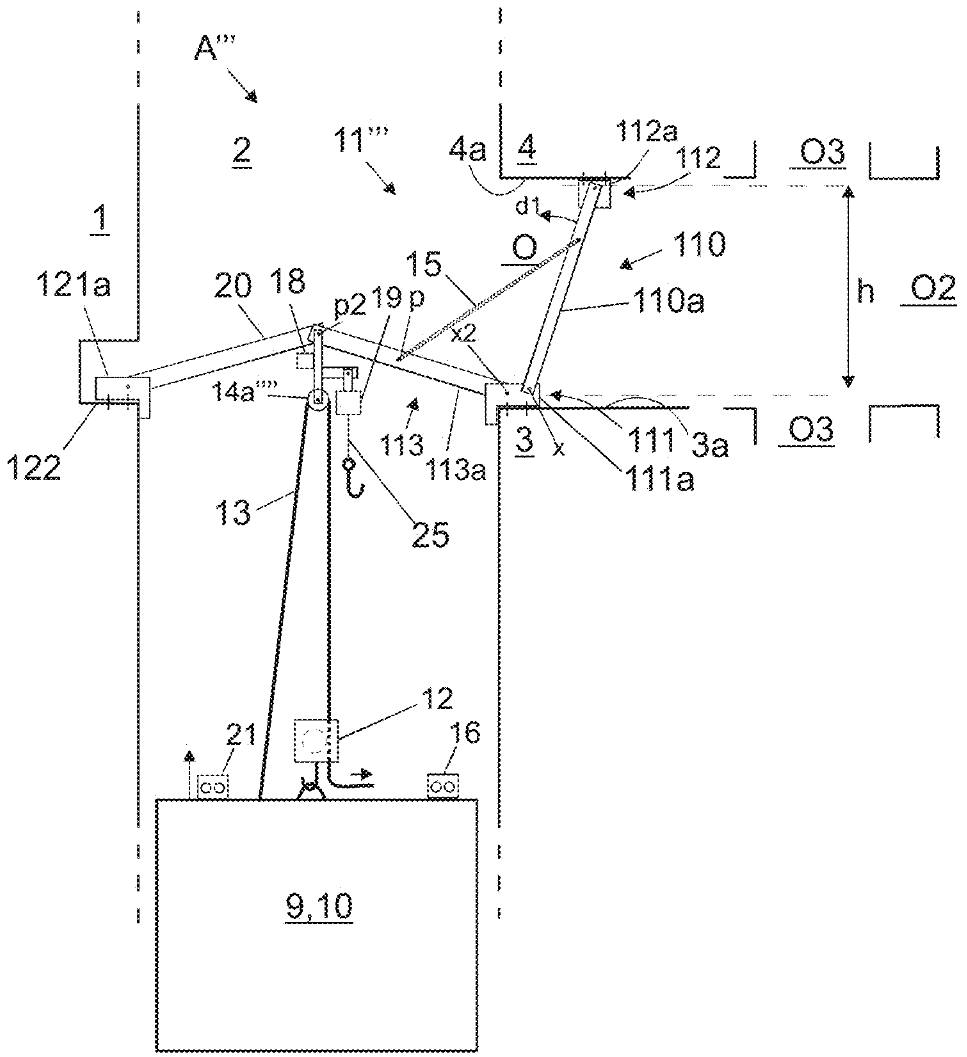
FIG. 5 illustrates a construction arrangement A of an elevator according to a fourth embodiment.

FIG. 5 illustrates a construction arrangement of an elevator according to a fourth embodiment. This embodiment is otherwise similar to what is shown in and described referring to FIG. 4, but the flexible tension member 13 is routed and connected to the support structure 11''' via a diverting wheel mounted via a support member on the support beam 113*a* of the support structure 11''', and the support structure 11''' is otherwise similar to the support structure 11'' of FIG. 4 but in the embodiment of FIG. 5, there are an additional parts 20 and 121*a*, which will be described later in the following, as well as an additional support member and the diverting wheel mentioned above. With regard to other features than the differences mentioned above, their structures and functions are described referring to FIG. 4.

The support structure 11''' comprises a third support member 121*a* engaging a structure 122 of the opposite side of the hoistway 2 than the opening O, and a second support beam structure 20 protruding from the third support member 121*a* towards the support beam structure 113, these being connected to each other, in particular the connection point being within the central area of the vertical projection of the hoistway 2. This facilitates that the support structure 11''' is firmly and reliably mounted owing to the multiple support points provided by it. The third support member 121*a* is fixed immovably to the structure 122, preferably by releasable fixing means. Said fixing means are preferably as earlier described in context of FIG. 2, such as releasable fixing means comprising one or more bolts. The bolts may be anchor bolts for instance. The connection point p2 between the second support beam structure 20 and the support beam structure 113 is preferably higher than the third support member 121*a* and the first support member 111*a*. This facilitates a downwards pulling force caused by the load tends to widen the support structure 11''' and the support structure 11''' becomes even more firmly anchored. The second support beam structure 20 and the support beam structure 113 are preferably pivotally connected at said connection point p2, whereby said widening is facilitated.

Figure 6:
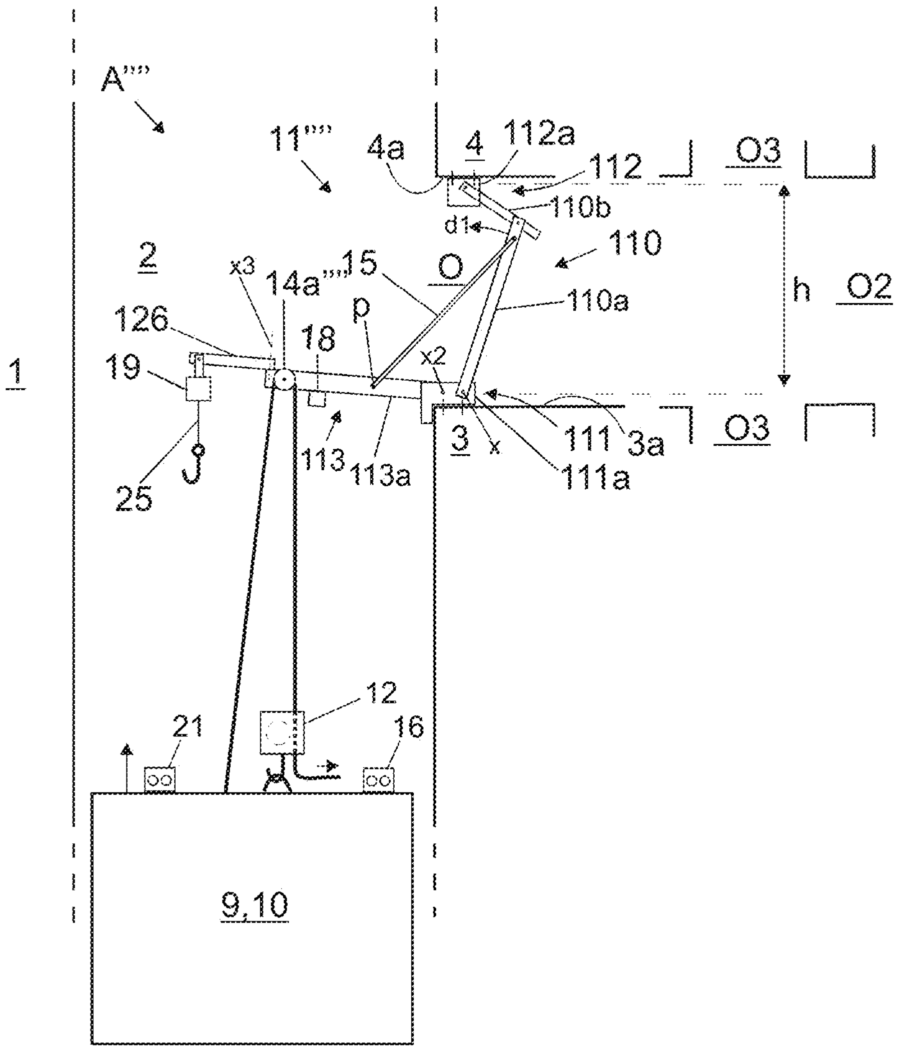
FIG. 6 illustrates a construction arrangement A of an elevator according to a fifth embodiment.

FIG. 6 illustrates a construction arrangement of an elevator according to a fifth embodiment. This embodiment is otherwise similar to what is shown in and described referring to FIG. 1, but the hoisting device 12 is differently positioned and the flexible tension member 13 is, for this reason, routed differently with a different diverting wheel arrangement. The second hoisting device 19 is also differently mounted on the support structure 11'''', in particular via a support beam 126 mounted on the support beam 113*a* of the support structure 11''''. The support beam 126 is preferably mounted pivotally relative to the support beam 113*a*, in particular the pivoting axis x3 thereof preferably being oriented in less than 45 degrees from vertical. By pivoting the support beam 126 around said axis x3, the position of the second hoisting device 19 in horizontal direction can be adjusted.

In this embodiment, the hoisting device 12 is mounted on the load 9,10 and the flexible tension member 13 is routed and connected to the support structure 11'''' via a diverting wheel 14*a*'''' mounted on the support beam 113*a* of the support structure 11''''. The hoisting device 12 is arranged to pull the load 9,10 upwards by pulling the flexible member 13. This is arranged in particular such that an end of the flexible tension member 13 is fixedly connected to the load 9,10, and from the load, the flexible tension member 13 passes upwards, over the diverting wheel 14*a* and down back to the hoisting device 12.

With regard to other features than the differences mentioned above, their structures and functions are described referring to FIG. 1.

Figure 11:
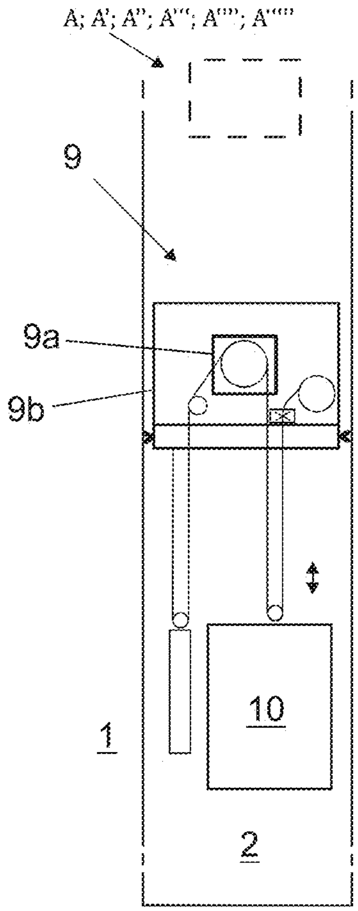
FIGS. 11-13 illustrate phases of a method according to a first embodiment.
Figure 12:
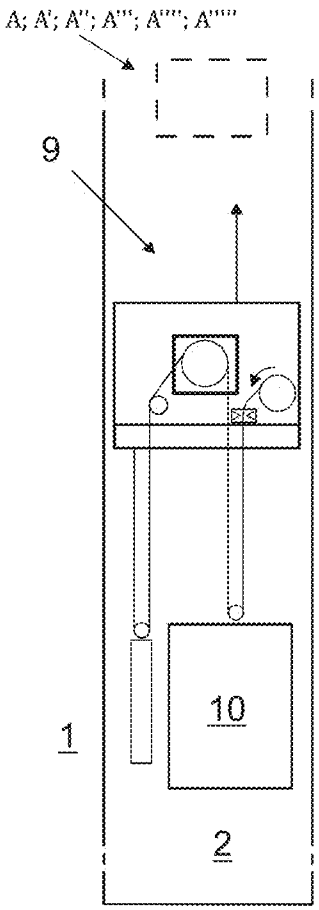
Figure 13:
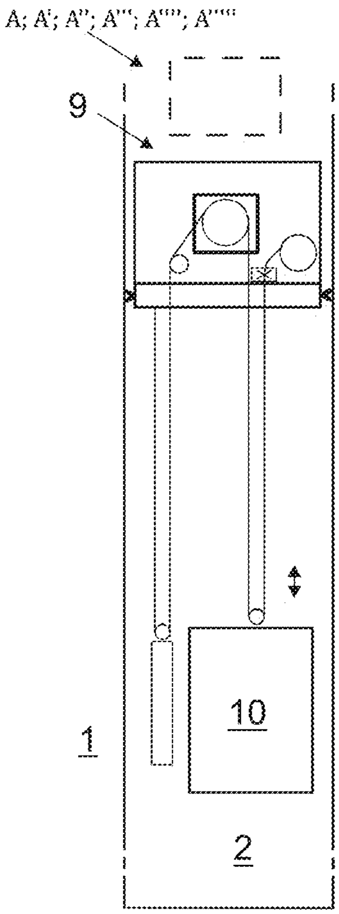

FIGS. 11-13 illustrate phases of a method according to a first embodiment. In this embodiment, a hoisting arrangement A; A'; A''; A'''; A''''; A''''' as illustrated in and described referring to any of FIGS. 1-10 is used for achieving the hoisting as indicated by arrow in FIG. 12. The hoisting arrangement A; A'; A''; A'''; A''''; A''''' is in this embodiment used for performing hoisting operations in a so called jump-lift method. The details of the hoisting arrangement A; A'; A''; A'''; A''''; A''''' have been omitted from FIGS. 11-13, which illustrate merely by a schematic broken line box the features of the hoisting arrangement A; A'; A''; A'''; A''''; A''''' and by an arrow movement of the load 9 when hoisted.

In the method of FIGS. 11-13, the load to be hoisted is a movable machine room 9 positioned above an elevator car 10 disposed in the hoistway 2.

The method comprises providing a construction arrangement A; A'; A''; A'''; A''''; A'''''. The method moreover comprises using the elevator car 10 for transporting passengers and/or goods below the movable machine room 9 in particular while the machine room 9 is mounted in a first position and suspends the elevator car 10 below it via a hoisting roping. This using has been illustrated in FIG. 11.

After said using, the method comprises hoisting the movable machine room 9 with the hoisting arrangement A; A'; A''; A'''; A''''; A''''' from said first position to a higher second position. This hoisting has been illustrated in FIG. 12.

The elevator car 10 and its counterweight can be parked stationary in any location during said hoisting of the movable machine room 9. However, this is not necessary since the car 10 could be hoisted together with the movable machine room 9. In this latter case, the car would preferably be fixedly hanged from the movable machine room 9 e.g. by a suspension arrangement other than the hoisting roping of the car 10. This would be advantageous since it facilitates easy adjustment of rope lengths, for example. In said latter case, the counterweight would preferably rest on its buffer the time of said hoisting.

After said hoisting, the method comprises using the elevator car 10 for transporting passengers and/or goods below the movable machine room 9 in particular while the machine room 9 is mounted in the second position and suspends the elevator car 10 below it via a hoisting roping. FIGS. 11-13 illustrate one way to implement routing and supply of the hoisting roping via an openable rope clamp from a rope supply reel arrangement. However, these could be implemented also in any other way, since there are multiple different alternative known solutions for this.

The machine room 9 is mountable in different positions in the hoistway 2, preferably by a mounting means operable to engage stationary structures and to disengage from the stationary structures. The manner of mounting of the machine room 9 is illustrated only schematically since also since there are multiple different alternative known solutions also for this. One way, for instance, is that said mounting means are movable support members, such as claws or arms, which are extendable into and retractable out from pockets or other openings of the hoistway walls. The aforementioned stationary structures are then the hoistway walls. Another way, for instance, is that said mounting means are movable support members, such as claws or arms, which are extendable into being positioned above structures such as brackets of guide rails and retractable out from being above said structures. As a further alternative, the aforementioned stationary structures could be vertically oriented guide rails mounted in the hoistway 2, for instance, in which case the mounting means could comprise grippers suitable for engaging by gripping the guide rails, and disengage by releasing the grip.

Figure 14:
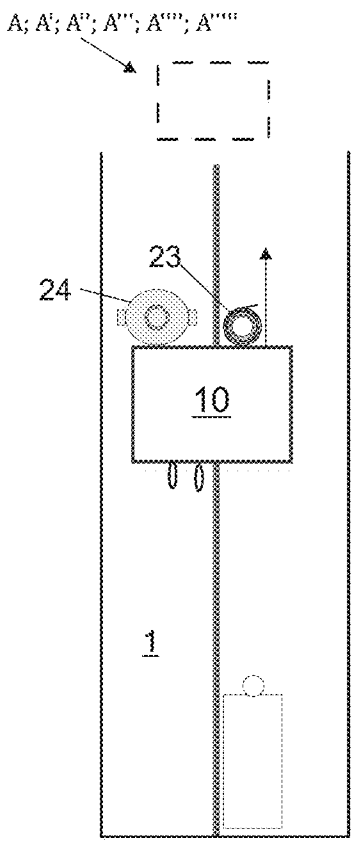
FIGS. 14-15 illustrate phases of a method according to a second embodiment.
Figure 15:
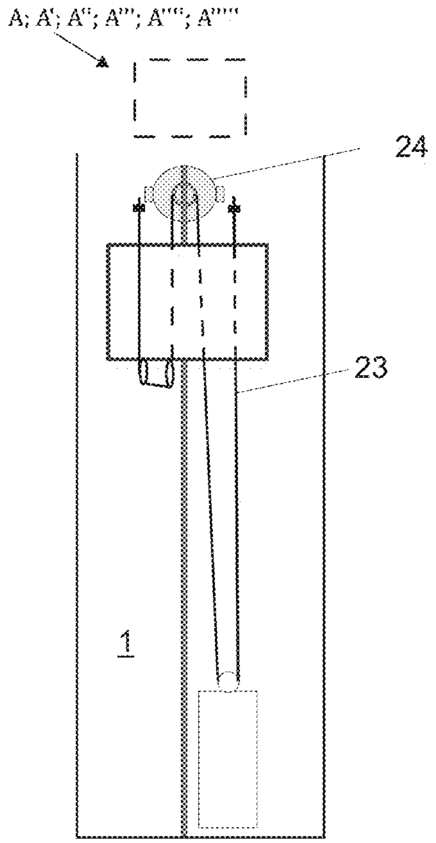

FIGS. 14-15 illustrate phases of a method according to a second embodiment. In this embodiment, a hoisting arrangement A; A'; A"; A'"; A""; A""' as illustrated in and described referring to any of FIGS. 1-10 is used for achieving the hoisting as indicated by an arrow in FIG. 14. The hoisting arrangement A; A'; A"; A'"; A""; A""' is in this embodiment used for performing a hoisting operation in installation method of an elevator. The details of the hoisting arrangement A; A'; A"; A'"; A""; A""' have been omitted from FIGS. 14-15, the Figures illustrating merely by a schematic broken line box the features of the hoisting arrangement A; A'; A"; A'"; A""; A""' and by an arrow movement of the load 9 when hoisted.

In the method of FIGS. 14-15, said load is an elevator car 10 disposed in the hoistway 2.

The method comprises providing a construction arrangement A; A'; A"; A'"; A""; A""'. The method moreover comprises hoisting the elevator car (10) in the hoistway (2) with the hoisting arrangement A; A'; A"; A'"; A""; A""' as illustrated in and described referring to any of FIGS. 1-10, and thereafter suspending the elevator car (10) with a hoisting roping 23, and thereafter removing the elevator car (10 from being suspended by the hoisting arrangement. Thereafter, the method comprises moving the elevator car 10 suspended by the hoisting roping 23, in particular for transporting passengers and/or goods. The moving is then preferably performed by a hoisting machine 24 for moving the hoisting roping 23.

In the method of FIGS. 14-15, a hoisting machine 24 for moving a hoisting roping 23 is transported into proximity of its installation position on top of the car 10 during the hoisting thereof. This is, however, not necessary since steps of installation of the hoisting machine 24 could be performed also differently by alternative ways, e.g. using scaffolds mounted in the upper part of the hoistway 2, for instance.

In the method of FIGS. 14-15, a hoisting roping 23 (or at least part thereof) is transported upwards in the hoistway by the car 10 during the hoisting of the car 10. Thus, it can be brought to position where it can be placed to pass around a drive wheel of a hoisting machine 24 positioned in the upper parts of the hoistway 2. This is, however, not necessary since steps of transporting the hoisting roping 23 into a high position in the hoistway 2 could be performed also differently by alternative ways, e.g. via a floor opening, for instance. In general, the hoisting roping 23 need not be transported as a reel, although this is disclosed in the simplistic version of FIG. 14, since a tail or a loop of the hoisting roping 23 could be left in the bottom parts of the hoistway, and an end or a loop of the hoisting roping 23 could be transported by pulling it up with the elevator car 10 in said hoisting.

Figure 2:
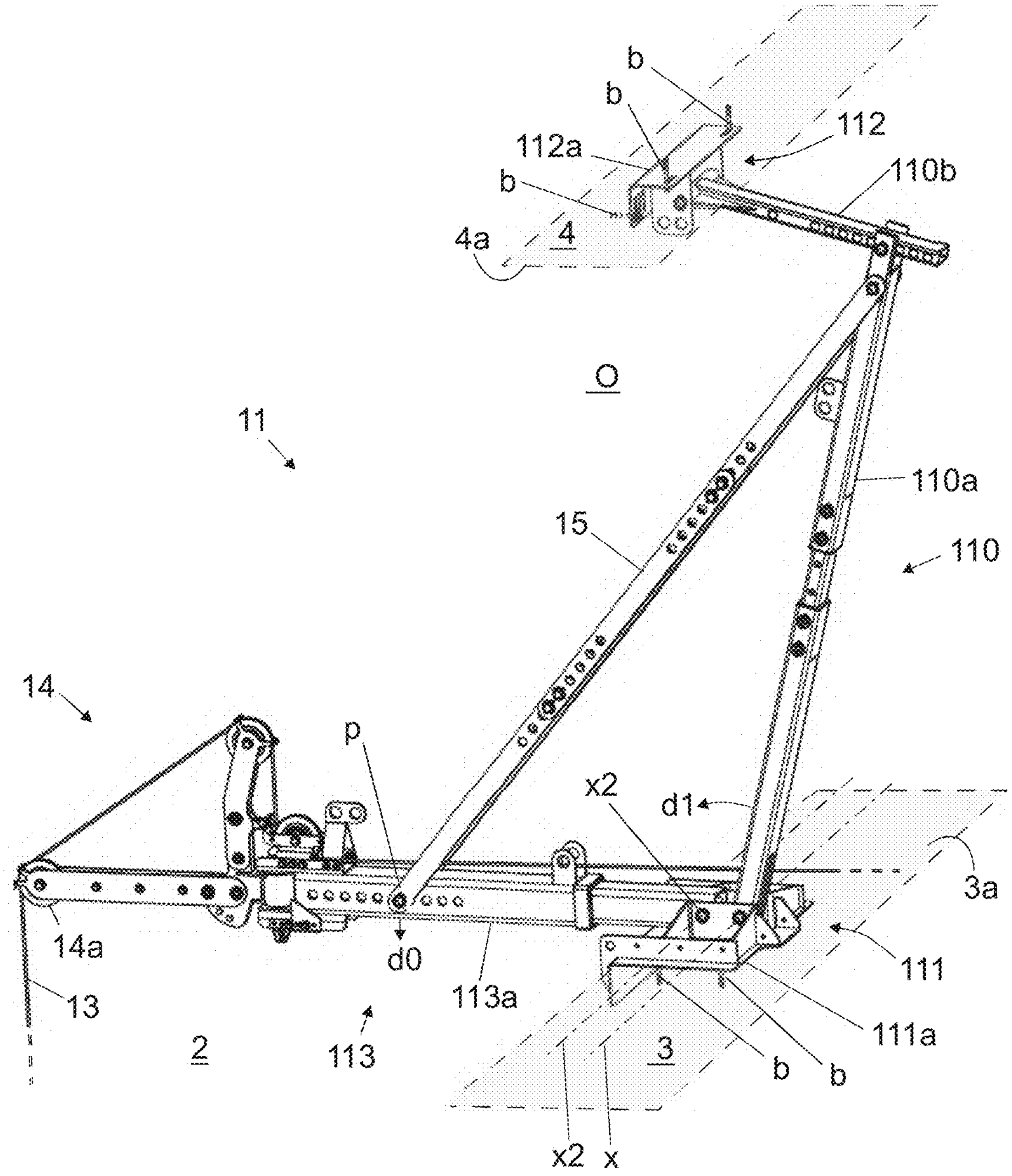
Figure 16:
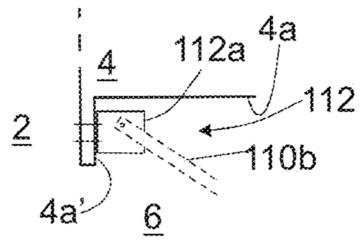
FIG. 16 illustrates a preferred alternative features of the upper edge structure and face orientation utilized.

In the preferred embodiments presented in FIGS. 1-6, the face 3*a* of the lower edge structure 3 engaged by the lower end 111 faces upwards, and the face 4*a* of the upper edge structure engaged by the upper end 112 faces downwards. In a preferred embodiment, 1-6, the face 3*a* of the lower edge structure 3 is particularly horizontal, and the face 4*a* of the upper edge structure is horizontal. It is not necessary that the face of the upper edge structure engaged by the upper end 112 faces downwards, since it could alternatively face outwards from the hoistway 2, as illustrated in FIG. 16. In a preferred embodiment, 1-6, the face 3*a* of the lower edge structure 3 is particularly horizontal, and the face 4*a*' of the upper edge structure 4 is vertical. FIG. 16 illustrates therefore an alternative face on which the second support member 112*a* can be fixed immovably. This can be implemented as defined elsewhere, e.g. by bolts b. As illustrated in FIG. 2, the second support member 112*a* can be designed to be able to be fixed against plurality of differently oriented faces. FIG. 2, illustrates also a bolt b pointing horizontally whereby fixing against a vertical face 4*a*' is facilitated.

In general, the hoisting device 12 can be any kind of device suitable for pulling a flexible member 13. In general, the hoisting device 12 preferably comprises a motor and an engaging member such as a drum or roller engageable with the flexible member 13 and rotatable with the motor. For example, the hoisting device 12 can be a Tirak™-hoist, or a drum or roller around which flexible member 13 can be rolled by motorized rotation of the drum or roller.

As described, the support beam structure is connected to the lower end of the anchoring beam structure, in particular to a first support member thereof. This connection is preferably pivotal as described referring to the preferred embodiments. However, pivotal connection is not here necessary, because the connection could be also different, and even integral. If integral, then the support beam structure and the first support member would be integrally connected, i.e. made as one-piece structure.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A construction arrangement of an elevator, comprising a hoistway formed in a building, the hoistway comprising at least one hoistway opening leading in horizontal direction out from the hoistway, the opening being delimited by a lower edge structure and an upper edge structure; and
- a load in the hoistway lower than said opening; and
- a hoisting arrangement for hoisting said load, wherein said hoisting arrangement comprises
  - a support structure mounted higher than said load; and
  - a hoisting device; and
  - at least one flexible tension member connected or at least connectable to said load;
- wherein the at least one flexible tension member is movable with said hoisting device in particular for thereby transmitting a hoisting force to said load to be hoisted, wherein said support structure comprises
- an anchoring beam structure comprising
  - a lower end engaging the lower edge structure, in particular a face thereof,
  - an upper end engaging the upper edge structure, in particular a face thereof, and
  - a pivotal beam mounted to the lower end of the anchoring beam structure, the pivotal beam forming an obtuse angle from a horizontal face of the lower edge structure facing the hoistway and being configured to pivot in a first pivoting direction around the lower end of the anchoring beam structure towards hoistway in an operating position; and a support beam structure connected to the anchoring beam structure and protruding from the anchoring beam structure into the hoistway; and wherein said at least one flexible tension member hangs in the hoistway supported by the support beam structure.

2. The arrangement according to claim 1, wherein said load is an elevator car or a load positioned above an elevator car disposed in the hoistway.

3. The arrangement according to claim 2, wherein the load positioned above an elevator car disposed in the hoistway comprises a hoisting machine and/or a structure carrying a hoisting machine.

4. The arrangement according to claim 1, wherein the at least one flexible tension member extends downwards from the support beam structure in the hoistway towards said load to which the at least one flexible tension member is connected or at least connectable.

5. The arrangement according to claim 1, wherein the construction arrangement comprises a second hoisting device inside the hoistway and mounted on the support structure, and at least one second flexible tension member, wherein the second hoisting device is configured to move the at least one flexible tension member.

6. The arrangement according to claim 1, wherein said support structure comprises a diverting wheel arrangement mounted on the support beam structure, and the at least one flexible tension member is arranged to pass from the hoisting device to a diverting wheel of the diverting wheel arrangement, the diverting wheel being arranged to guide at least one flexible tension member to pass downwards in the hoistway towards the load to which the at least one flexible tension member is connected or at least connectable.

7. The arrangement according to claim 1, wherein the pivotal beam engages the lower edge structure and said upper end comprises a support member engaging the upper edge structure.

8. The arrangement according to claim 1, wherein the anchoring beam structure comprises one or more beams, and the one or more beams being configured to adjust a height to be increased for tightening the lower end to press against the lower edge structure, in particular against a face of the lower edge structure, and the upper end to press against the upper edge structure, in particular against a face of the upper edge structure, the pivotal beam being included in the one or more beams.

9. The arrangement according claim 8, wherein the pivotal beam is mounted pivotally around an axis, and pivotal beam being configured to increase the height by pivoting said pivotal beam around said axis towards the first pivoting direction.

10. The arrangement according to claim 9, wherein the pivotal beam is mounted in such a position that pivoting around said axis towards said first pivoting direction moves the upper end of the pivotal beam upwards and towards the hoistway.

11. The arrangement according to claim 9, wherein the pivotal beam is mounted in such a position that said upper end of the pivotal beam is higher and on the opposite horizontal side of the axis than the hoistway.

12. The arrangement according to claim 9, wherein the support structure comprises at least one tensioner connected between a connection point of the support beam structure and the pivotal beam, the tensioner being configured to be tensioned to pull the pivotal beam to turn towards said first pivoting direction, and the tensioner including at least one of a bracket, a flexible tension member or a pulling device.

13. The arrangement according to claim 1, wherein the support beam structure comprises a support beam mounted on the anchoring beam structure, in particular on a first support member thereof, pivotally around a horizontal axis.

14. The arrangement according to claim 1, wherein the support structure comprises an opposite side support member engaging a structure of the opposite side of the hoistway than the opening, and a second support beam structure protruding from the opposite side support member towards the support beam structure, these being connected to each other, in particular the connection point being within the central area of the vertical projection of the hoistway.

15. A method for constructing an elevator comprising:

providing a construction arrangement according to claim 1, and hoisting the load in the hoistway with the hoisting arrangement.

16. The method according to claim 15, wherein said load is an elevator car, and the method comprises hoisting the elevator car in the hoistway with the hoisting arrangement, and thereafter suspending the elevator car with a hoisting roping, and thereafter removing the hoisting arrangement.

17. The method according to claim 15, wherein said load is a movable machine room positioned above an elevator car disposed in the hoistway, wherein the method comprises using the elevator car for transporting passengers and/or goods below the movable machine room in particular while the machine room is mounted in a first position and suspends the elevator car below the machine room via a hoisting roping; and thereafter hoisting the movable machine room with the hoisting arrangement from said first position to a higher second position, and thereafter using the elevator car for transporting passengers and/or goods below the movable machine room in particular while the machine room is mounted in a second position and suspends the elevator car below the machine room via the hoisting roping.

* * * * *